(12) United States Patent
Venable et al.

(10) Patent No.: US 7,436,549 B2
(45) Date of Patent: Oct. 14, 2008

(54) PATCH CODES FOR COLOR CALIBRATION JOB IDENTIFICATION ENCODING

(75) Inventors: Dennis L. Venable, Marion, NY (US); Thyagarajan Balasubramanian, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 272 days.

(21) Appl. No.: 11/247,552

(22) Filed: Oct. 11, 2005

(65) Prior Publication Data

US 2006/0028699 A1  Feb. 9, 2006

Related U.S. Application Data

(62) Division of application No. 09/710,106, filed on Nov. 10, 2000, now Pat. No. 6,972,867.

(51) Int. Cl.
*H04N 1/46* (2006.01)

(52) U.S. Cl. ........................................ 358/1.9; 358/504

(58) Field of Classification Search ................. 358/1.9, 358/2.1, 406, 413, 471, 488, 515, 530, 538, 358/3.23, 504, 517, 518, 537, 1.6; 400/279
See application file for complete search history.

(56) References Cited

U.S. PATENT DOCUMENTS

| | | | |
|---|---|---|---|
| 5,491,568 A | 2/1996 | Wan | |
| 5,684,885 A | 11/1997 | Cass et al. | |
| 6,008,907 A | 12/1999 | Vigneau et al. | |
| 6,048,117 A | 4/2000 | Banton | |
| 6,163,389 A | 12/2000 | Buhr et al. | |
| 6,473,199 B1 | 10/2002 | Gilman et al. | |
| 6,972,867 B1* | 12/2005 | Venable et al. | 358/1.9 |
| 7,185,816 B1* | 3/2007 | Shoobridge | 235/462.04 |
| 2003/0179395 A1* | 9/2003 | Kodama et al. | 358/1.9 |
| 2005/0269416 A1* | 12/2005 | Sussmeier et al. | 235/494 |
| 2006/0028669 A1* | 2/2006 | Venable et al. | 358/504 |
| 2006/0066882 A1* | 3/2006 | Yamauchi et al. | 358/1.9 |
| 2006/0098241 A1* | 5/2006 | Cheong et al. | 358/463 |
| 2006/0249588 A1* | 11/2006 | Walmsley et al. | 235/494 |
| 2007/0051161 A1* | 3/2007 | Friedman et al. | 73/10 |

FOREIGN PATENT DOCUMENTS

| | | | |
|---|---|---|---|
| JP | 406155851 A | * | 6/1994 |
| WO | WO 98/50882 | | 11/1998 |
| WO | WO 00/44164 | | 7/2000 |

* cited by examiner

*Primary Examiner*—Jerome Grant, II
(74) *Attorney, Agent, or Firm*—Fay Sharpe LLP

(57) ABSTRACT

A color calibration job identification system and method are provided, wherein the job identification data is encoded on a printed page, in a patch code, along with color targets, according to a protocol and format approximately identical to a format of the color targets. The patch code comprises a first portion, including a start code, and a second portion, including job identification data. The first portion of the patch code is comprised of two or more small color patches, each having a predefined color. The second portion of the patch code is comprised of two or more small color patches wherein each of the patches is comprised of a color selected from a plurality of colors, wherein each of the colors is indicative of a unique datum value, preferably an octal digit. The system provides a means for determining correct functioning of a printer and a means for determining an orientation of a printed page in a scanning device.

18 Claims, 3 Drawing Sheets

PATCH CODES FOR COLOR CALIBRATION JOB IDENTIFICATION ENCODING

This is a divisional of U.S. patent application Ser. No. 09/710,106, Filed Nov. 10, 2000, now U.S. Pat. No. 6,972,867 entitled "PATCH CODES FOR COLOR CALIBRATION JOB IDENTIFICATION ENCODING."

BACKGROUND OF THE INVENTION

This application is directed to patch codes for color calibration job identification encoding. Typically, there are two phases involved in the color correction of a color printer: calibration and characterization. Calibration involves maintaining the printer at a defined state, while characterization involves determination of the multidimensional transformation or profile that relates device color signals (e.g. CMYK) to spectrophotometric or colorimetric signals (e.g. CIELAB). Typically, characterization is performed relatively infrequently, sometimes only once at the factory that produces the printer. Calibration, on the other hand, needs to be performed frequently to compensate for printer drift and bring the device back to its nominal state. While the term calibration will be used throughout this application, the ideas also apply equally to the characterization process.

The calibration process involves sending an image with pre-specified device signals (i.e. a target) to the printer, and making spectrophotometric measurements of the print with the use of a spectrophotometric scanner. The device and spectrophotometric signals together are used to build or update the calibration tables.

In a production environment, many printers, perhaps 30 to 40, might be going through a calibration process at the same time. In a typical environment, operators must manually keep track of each printed page, and there can be many printed target types printed for each printer. The operator must then feed each page to a spectrophotometric scanner and tabulate results of scanning each target type. The results of each scan must be manually associated to the corresponding printed target, and to the correct printer. Considering the quantity of pages printed and the amount of work necessary to manually track each printed page, there is considerable possibility for error. Pages can be accidentally misordered, and scanning results can accidentally be associated with an incorrect printed target or printer. This can result in highly inaccurate calibrations, and calls upon the difficult task of diagnosing the errors.

It would be desirable, therefore, to provide automation to the color printer calibration process, breaking the cycle where an operator must keep track of all details. It is further desirable that the job identification data be encoded according to a scheme wherein job identification data is printed according to a protocol and in a format approximately identical to a format of said target.

SUMMARY OF THE INVENTION

The present invention automates the color printer calibration process, wherein the spectrophotometric scanner reads job identification data from each printed page where it has been recorded by the calibration system on the printer being calibrated. This job identification data will desirably include encoded printer identification, what part of the calibration is being tested (target), the current date, an operator name, and any additional information deemed necessary in a given production environment.

A system is provided for encoding job-specific identification information to be extracted by the same spectrophotometric scanner as is typically used in existing calibration systems. Since scanning software can read job-specific identification information from a printed page containing target color patches, it is not necessary for a human operator to have expertise in handling printed pages and scanner results. The use of predefined start codes as part of the data encoding scheme allows early detection of major print problems such as separation drop out. Also, it enables an ability of the software to check for simple errors in page positioning such as placing the page on the scanner in a wrong orientation. Positioning errors are accounted for in the software and the scanned page is processed correctly without human intervention. This greatly enhances the robustness of the scanning part of the calibration process. Having job identification information stored within the page and machine readable output from the scanner results in the operator not having to track which scanner output is associated with a particular printer or target. Software can be used to track a calibration state without human intervention, thus reducing the potential for errors, and providing increased robustness to the system.

DESCRIPTION OF THE DRAWINGS

The present invention exists in the construction, arrangement, in combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

There are many techniques for encoding information onto a printed page, glyphs, Cauzin strips and bar codes for example. However, these are typically read by scanners designed to handle a specific type of data. Glyphs require two-dimensional platen scanning. Cauzin strips require the Cauzin strip reader or two-dimensional platen scanning with appropriate software. Handheld laser scanners are typically used to read bar codes. For color calibration applications, in order to maximize robustness, it is desirable to minimize the number of times a human operator has to manipulate printed pages. It is therefore preferable to have a scanner that scans for spectrophotometric values (calibration data) also scan for job identification information. A spectrophotometric scanner typically used for calibration moves to a particular coordinate and then commences scanning for color values. One such scanner may a Gretag spectrophotometer (from Gretag Imaging Inc.). Use of a scanner of this type results in implementation of an encoding scheme that will function in that mode, wherein job identification data is printed according to a protocol and in a format approximately identical to the format of the calibration data. A patch code scheme satisfies the aforementioned issues.

A patch code is a sequence of color patches, each of which is selected from a set of colors that are readily distinguished from each other on any printer, whether or not it is calibrated. Good candidates for patch codes are the primary colorants cyan, magenta, yellow, the secondary mixtures red, green, blue, paper white, and mid-gray. Black is not used because of possible confusion with blue. Also, rendition of a good black often requires an optimum combination of cyan (C), magenta (M), yellow (Y), and black (K). This requires intimate knowledge of the printing process, which may not be known at the time of calibration. This set of 8 patch codes allows each patch to encode 3 bits of data, or a single digit in an octal numbering system.

For example, an octal digit represents one integer in the range 0-7 which can alternately be represented by a three digit binary integer in the range 000-111. A single row of twenty patch codes can encode up to sixty bits of data. Four such rows can encode up to two hundred and forty bits of information.

Figure 1:
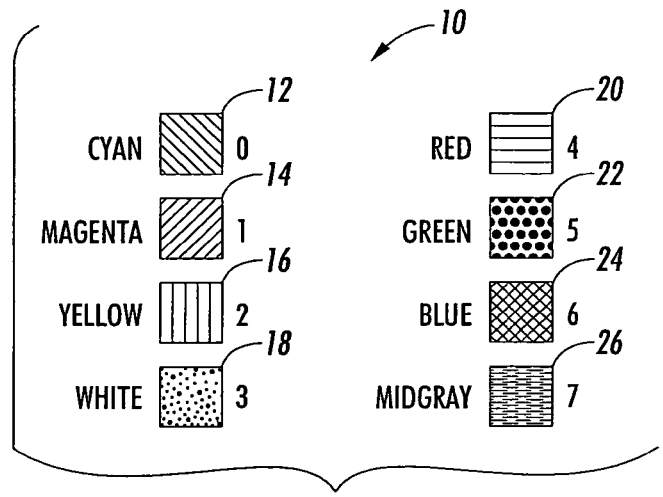
FIG. 1 illustrates an exemplary protocol for encoding binary values into patch codes.

To use patch codes, a protocol is defined. FIG. 1 illustrates an exemplary encoding scheme 10 of binary values into patch codes. Normally each color patch is a different color, however, to distinguish each of the eight colors on a black-and-white document, each color is represented in FIG. 1 and all remaining figures by a unique format of cross hatches, dots or shade of gray. A cyan color patch 12 is represented by diagonal cross hatching that slopes downward towards the right side. A magenta color patch 14 is represented by diagonal cross hatching that slopes upward towards the right side. A yellow color patch 16 is represented by vertical cross hatching. A white color patch 18 is represented by a pattern of dots. A red color patch 20 is represented by horizontal cross hatching. A green color patch 22 is represented by a checkerboard pattern. A blue color patch 24 is represented by diagonal cross hatching. Finally a midgray color patch 26 is represented by a solid shade of gray.

Figure 2:
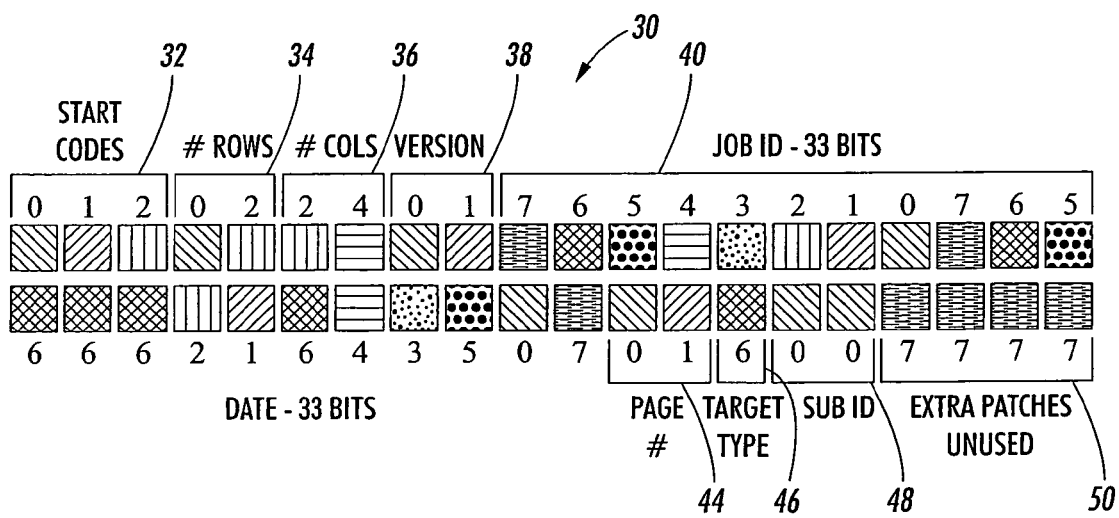
FIG. 2 depicts an exemplary patch code format.

FIG. 2 illustrates one possible format for a two row, twenty column patch code 30. The first three color patches of the first row, has the colors cyan 12, magenta 14 and yellow 16, in that order, forming a start code 32. This code is a confirmation to the system that the patches about to be encountered are patch codes. If the start codes are not encountered at the very beginning of the measurement file, the system will suspect incorrect orientation of the target. This can then potentially be corrected at the very onset of the measurement processing step. The next two color patches represent a number of rows 34, in octal, of patch code 30. In the exemplary patch code in FIG. 2, a cyan-yellow pair of color patches is shown, indicating a total number of 2 rows. The following two color patches represent the number of columns 36, or width, of patch code 30 in terms of the number of color patches per row. The example shows a yellow-red pair of color patches, indicating an octal 24, or 20 color patches per row. The next two color patches represent a patch code version number 38, currently set to 1 (i.e. cyan, magenta). The patch code version number will be incremented when new fields are added or fields are changed to an initial patch code. Remaining color patches in patch code 30 represent job or other data depending on a specific format of the patch code version number 38. For exemplary version 1, the following information is encoded:

a job ID 40, 33 bits in length, containing a unique ID used as a key to access a state of a given printer calibration;

a date 42, 33 bits in length, containing a print file creation time in seconds from Jan. 1, 1970 or other selected time;

a page number 44, 6 bits in length, containing a calibration page number;

a target type 46, 3 bits in length, identifying what type of color target is printed on a page containing patch code 30;

a sub ID 48, 6 bits in length, used to track experimental variations from the standard calibration path; and, extra unused color patches 50 can be printed with any appropriate code, midgray corresponding to an octal 7 is shown in the example.

Other information which can be included in the patch code as it suits the user's application. For example, recording the type of marking technology, for example, xerographic versus inkjet versus dye sublimation, etc., may be of considerable value in optimizing the calibration process. Recording the type of medium, for example, coated paper stock, uncoated matte stock, etc., may also be of value in calibration.

The two-row patch code 30 illustrated in FIG. 2 can encode 93 bits of job information, with an additional 27 bits used for a start code 32, number of rows 34, number of columns 36 and version number 38. Adding an additional row would add an additional 60 bits of job information. The format illustrated uses 20 color patches in a single row while a typical printed page, U.S. legal size for example, is 8.5 inches minus whatever margins or hardware limitations may exist for a printer. Hardware limitations may reduce the overall printable width to 7 inches which would allow for 28 color patches, each ¼ inch wide, across a single page. However, since the locations of the start codes 32 must be well defined and unique to identify page rotations as explained below, a good choice is to select 20 color patches per row as typical. This is, of course, exemplary and can be adjusted for other applications.

As described above, start code 32 is in a fixed location relative to patch code 30, preferably as the first three color patches of patch code 30 as illustrated in FIG. 2. Placing start code 32 in the aforementioned position, and placing patch code 30 near the upper-left margins (as it is to be scanned) of a printed page provides several advantages.

Figure 3:
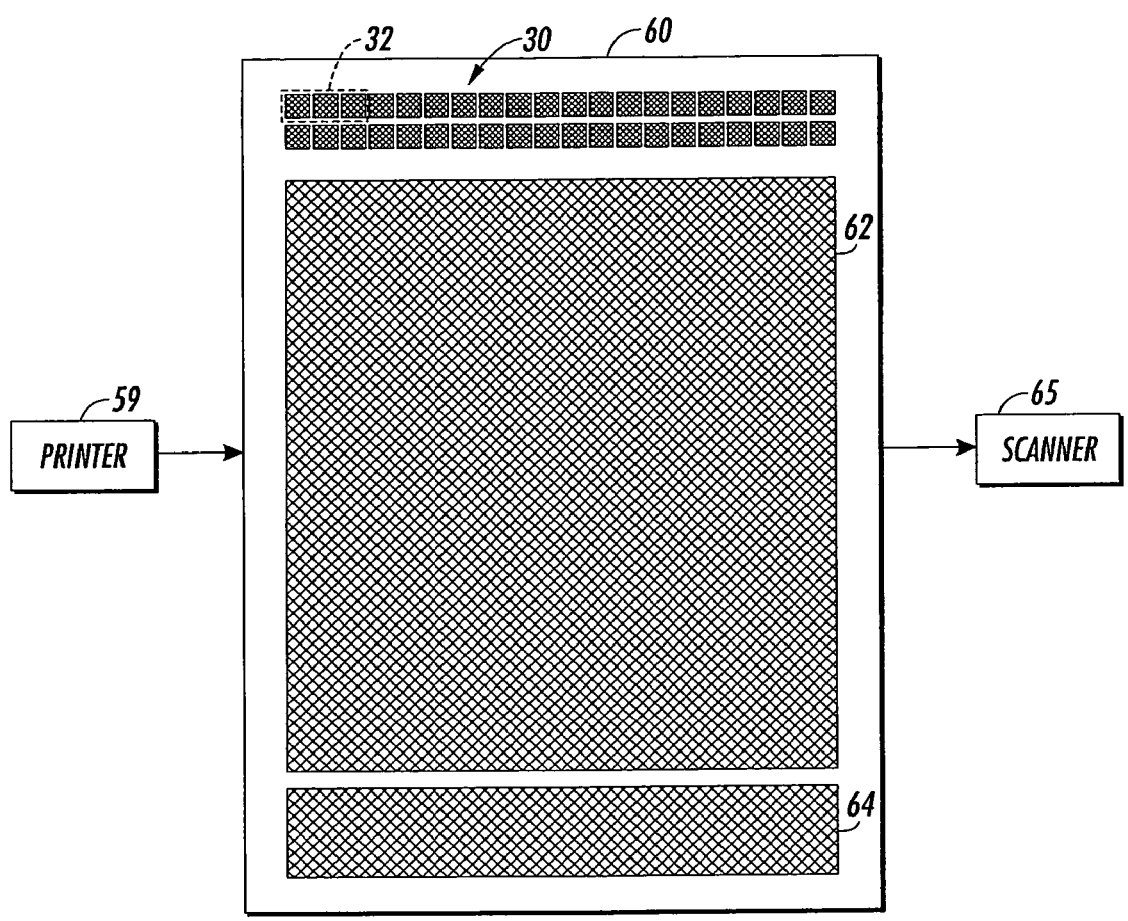
FIG. 3 illustrates an exemplary format for using patch codes in an application; and, FIG. 4 shows pages rotated from a preferred position.
Figure 4:
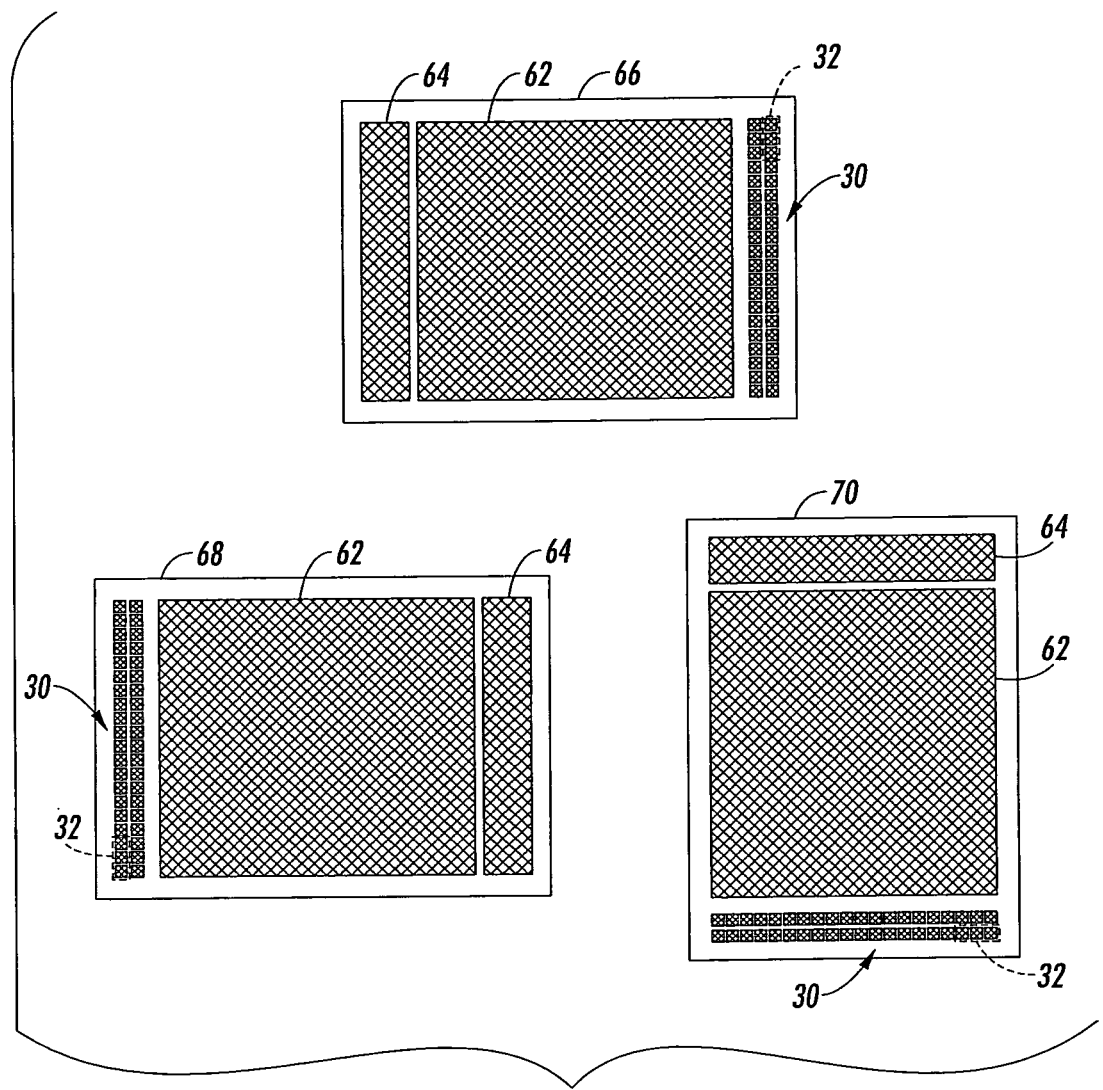

Use of the present invention permits scanner software to easily check for rotations of a page, or mispositioning of a page by checking several locations that correspond to common rotations or mispositioning of the page as illustrated in FIGS. 3 and 4. In FIG. 3, a printing device 59 holds a page 60, containing targets 62 and 64. Page 60 represents a page in a preferred orientation with respect to a spectrophotometric scanner system 65 to which page 60 will be transported for scanning, wherein the rows of patch code 30 are aligned in a preferred horizontal direction. The scanner system 65 first scans for start code 32 in the upper left corner of page 60, and having found start code 32 can assume that page 60 is correctly oriented and commence scanning for targets 62 and 64 in their preferred positions. Following the scanning process, readable spectrophotometric scan results are obtained by the scanner system 65, including the job identification data and calibration data. In an alternative embodiment, a system external to the scanner system 65 may be used to obtain the job identification data and calibration data.

Page 66 of FIG. 4 represents page 60 in a first rotated position, wherein start code 32 is now in the top right corner of page 66, and the rows of patch code 30 are now vertically aligned. The spectrophotometric scanner system 65 of FIG. 3 will first search for start code 32 in its preferred position, and having not found it there will search in a first alternate location for start code 32 as illustrated in page 66. Having found start code 32 in a first alternate position, the scanner can subsequently scan for targets 62 and 64 in their corresponding rotated positions. Pages 68 and 70 represent page 60 in second and third alternate rotations respectively. The spectrophotometric scanner system 65 would scan for start code 32 in second and third alternate positions only after failing to find start code 32 in previously scanned positions. In this manner, the scanner can detect for misrotated pages and, by scanning additional alternate positions, can detect mispositioned pages as well.

In an alternative embodiment the scanner would always scan the target in the same manner regardless of orientation of the printed page. A measurement processing system that is external to the scanner system would be used to search for the start code and appropriately rotate and reorder the spectrophometric data to the intended sequence.

Implementing a patch code permits the scanner software to quickly check that all separations of the printer are functioning correctly. After scanning for start code 32 in preferred and alternate rotations and positions, if the spectrophotometric scanner has failed to find start code 32, the scanner can provide an error indication to a user. This error indication would of course indicate that job ID 40 could not be found, and corrective action must be taken by a scanner operator.

The automation provided by the present invention eliminates the need of an operator to manually keep track of all calibration pages, the source printer and targets for each page, and the results of spectrophotometric scanning of each target-containing page. In a production environment wherein perhaps 30 to 40 printers are being calibrated at any one time, there is a very real possibility that mishandling can occur, especially considering that many target types can be printed for each printer. Pages can be accidentally placed out of order, and target scanning results can consequently be associated with an incorrect printer or an incorrect target type. The present invention provides a means of breaking the cycle where an operator must keep track of everything. The operator can simply feed target-containing pages to a scanner, and the scanner software can perform all of the tracking and identification details with a greatly reduced possibility for error.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

We claim:

1. A color calibration job identification system comprising:
    a printed page on which at least one color target including calibration data is printed by a printer; and,
    a patch code printed on the page, said patch code including job identification data uniquely associated with the calibration data useful to tracking a calibration state of the printer, wherein the color target and patch code are configured to be read by a same scanner to determine both page content and a calibration state of the printer.

2. The color calibration job identification system according to claim 1, said patch code further including:
    a first portion including a start code, wherein said start code includes two or more color patches wherein each of said patches have a predefined color; and,
    a second portion comprising said job identification data, wherein said job identification data includes two or more color patches wherein each of said patches is comprised of a color selected from a plurality of colors, each indicative of a unique datum value.

3. The color calibration job identification system according to claim 2, wherein said start code assists in determining correct functioning of a printer.

4. The color calibration job identification system according to claim 2, wherein said start code assists in determining an orientation of said printed page in a scanning device.

5. The color calibration job identification system according to claim 1, wherein said patch code comprises a rectangular array of color patches.

6. The color calibration job identification system according to claim 5, wherein said patch code further includes:
    one or more color patches defining a number of rows of said rectangular array; and,
    one or more color patches defining a number of columns of said rectangular array.

7. The color calibration job identification system according to claim 1, wherein said patch code includes one or more color patches defining a target type.

8. The color calibration job identification system according to claim 1, wherein said patch code includes one or more color patches specifying the type of marking technology.

9. The color calibration job identification system according to claim 1, wherein said patch code includes one or more color patches specifying the type of medium on which the patches are printed.

10. A color calibration job identification system comprising:
    a printed page on which at least one color target is printed by a printer; and,
    a patch code printed on the page, said patch code including job identification data for tracking a calibration state of the printer by software which uniquely associates the job identification data with calibration data obtained from the color target, wherein the job identification data is printed according to a protocol and in a format approximately identical to a format of the calibration data.

11. The color calibration job identification system according to claim 10, said patch code further including:
    a first portion including a start code, wherein said start code includes two or more color patches wherein each of said patches have a predefined color; and,
    a second portion comprising said job identification data, wherein said job identification data includes two or more color patches wherein each of said patches is comprised of a color selected from a plurality of colors, each indicative of a unique datum value.

12. The color calibration job identification system according to claim 11, wherein said start code assists in determining correct functioning of a printer.

13. The color calibration job identification system according to claim 11, wherein said start code assists in determining an orientation of said printed page in a scanning device.

14. The color calibration job identification system according to claim 10, wherein said patch code comprises a rectangular array of color patches.

15. The color calibration job identification system according to claim 14, wherein said patch code further includes:
    one or more color patches defining a number of rows of said rectangular array; and,
    one or more color patches defining a number of columns of said rectangular array.

16. The color calibration job identification system according to claim 10, wherein said patch code includes one or more color patches defining a target type.

17. The color calibration job identification system according to claim 10, wherein said patch code includes one or more color patches specifying the type of marking technology.

18. The color calibration job identification system according to claim 10, wherein said patch code includes one or more color patches specifying the type of medium on which the patches are printed.

* * * * *